United States Patent [19]
Ban et al.

[11] Patent Number: 5,216,890
[45] Date of Patent: Jun. 8, 1993

[54] DEVICE FOR AND METHOD OF PRODUCING HYPERFINE FROZEN PARTICLES

[75] Inventors: Cozy Ban; Itaru Kanno; Takaaki Fukumoto, all of Itami, Japan

[73] Assignee: Mitsubishi Denki Kabushiki Kaisha, Tokyo, Japan

[21] Appl. No.: 846,010

[22] Filed: Mar. 4, 1992

[30] Foreign Application Priority Data

Mar. 25, 1991 [JP] Japan ................. 3-59828

[51] Int. Cl.⁵ ............................... F25D 13/06
[52] U.S. Cl. ......................... 62/63; 62/121; 62/304
[58] Field of Search ............. 62/63, 57, 121, 304

[56] References Cited

U.S. PATENT DOCUMENTS

| | | | |
|---|---|---|---|
| 3,319,344 | 5/1967 | Saschel et al. | 62/57 |
| 3,364,690 | 1/1968 | Torobin | 62/58 |
| 3,670,520 | 6/1972 | Boniteil | 62/57 |
| 4,869,090 | 9/1989 | Tada et al. | 72/53 |
| 4,932,168 | 6/1990 | Tada et al. | 51/436 |

FOREIGN PATENT DOCUMENTS 63-91479 4/1988 Japan.

OTHER PUBLICATIONS

Schmidt et al., "Ausfriern von Eis an vibrierten Kuhlflachen", Chemie Ingenieur Technik 49, 1977, p. 169.
Ohmori et al, "Ultra Clean Ice Scrubber Cleaning With Jetting Fine Ice Particles", 176th ECS, 1989, p. 551.

Primary Examiner—Ronald C. Capossela
Attorney, Agent, or Firm—Leydig, Voit & Mayer

[57] ABSTRACT

A device for and a method of producing hyperfine frozen particles reduces the quantity of impurity particles in the hyperfine frozen particles produced and stabilizes the generation of hyperfine frozen particles. A hopper includes a heat exchanger through which a coolant, such as nitrogen gas or liquid nitrogen, is circulated. A nitrogen gas inlet through which low temperature nitrogen gas as a coolant is supplied includes a filter to produce a laminar flow of the gas.

10 Claims, 2 Drawing Sheets

DEVICE FOR AND METHOD OF PRODUCING HYPERFINE FROZEN PARTICLES

BACKGROUND OF THE INVENTION

1. Field of the Invention

This invention relates to a device for and a method of producing hyperfine frozen particles used, for example, for cleaning purposes.

2. Description of the Related Art

FIG. 2 is a schematic sectional view showing a conventional device for producing hyperfine frozen particles, and FIG. 3 is an enlarged sectional view taken along the line A—A of FIG. 2. In FIG. 2, provided in the upper section of a hopper 1 for ice making is a pure water spray nozzle 2. Connected to this pure water spray nozzle 2 is a pure water supply tube 3, from which pure water is sprayed into the hopper 1 through the pure water nozzle 2. Provided on the side wall of the hopper 1 are a plurality of supply pipes 5 for supplying liquid nitrogen. As shown in FIG. 3, liquid nitrogen is supplied in a spiral fashion through these supply pipes 5. Provided in the lowermost section of the hopper 1 is a discharge outlet 4 for discharging the hyperfine frozen particles produced.

In this conventional device for producing hyperfine frozen particles, constructed as described above, the pure water supplied through the pure water supply tube 3 is sprayed into the hopper 1 by the pure water spray nozzle 2. The atomized pure water undergoes heat exchange with the liquid nitrogen, which is supplied in a spiral fashion through a plurality of liquid nitrogen supply pipes 5, and forms hyperfine frozen particles, which descend inside the hopper 1 to be discharged through the discharge outlet 4.

The above-described device for producing hyperfine frozen particles has the following problems:

(1) The liquid nitrogen is allowed to come into contact with the inner wall of the hopper 1 and rapidly cools the wall portion of the hopper 1, with the result that cracks are produced in the wall portion. Such cracks will result in the generation of metal impurities, which may get mixed with the hyperfine frozen particles produced;

(2) There exist in the liquid nitrogen, which serves as the coolant for freezing the pure water, lots of fine particles of impurities, which are hard to remove and get mixed with the hyperfine frozen particles, thus making it impossible to produce high purity hyperfine frozen particles;

(3) When the atomized pure water and the liquid nitrogen are mixed with each other, there is generated, apart from the spiral flow, a turbulent flow or whirling, which will cause frozen particles to adhere to the inner wall and the ceiling portion of the hopper 1;

(4) When the hyperfine frozen particles produced are descending towards the discharge outlet 4, a turbulent flow is generated in that section of the hopper 1 where it tapers towards the discharge outlet 4, causing frozen particles to adhere to the hopper wall and the discharge outlet 4. When frozen particles have thus adhered, in the form of ice, to the ceiling, the wall surface and the discharge outlet 4 of the hopper 1, the hyperfine frozen particles produced are prevented from being discharged smoothly, and the device cannot be operated continuously since it requires frequent removal of ice therefrom; and (5) Since the adhesion of frozen particles prevents smooth discharge of hyperfine frozen particles, the pressure in the hopper 1 becomes unstable and causes a turbulent flow, thus causing a vicious cycle of turbulent flow generation and frozen particle adhesion.

SUMMARY OF THE INVENTION

This invention has been made with a view to solving these problems. It is accordingly an object of this invention to provide a device for and a method of producing hyperfine frozen particles which help to prevent the metal impurities generated in metal device sections, such as the hopper, from getting mixed with the hyperfine frozen particles; which prevent the impurity particles in the coolant gas from getting mixed with the hyperfine frozen particles by adopting a low temperature coolant gas; which prevent the generation of a turbulent flow, etc. by supplying the coolant gas in the form of a laminar flow; and which help to reduce the amount of frozen particles adhering to the hopper wall, the ceiling and the discharge outlet, thus making it possible to produce hyperfine frozen particles in a stable manner.

In order to achieve the above object, according to one aspect of the present invention, there is provided a device for producing hyperfine frozen particles comprising:

a hopper for ice making;

a heat exchanger provided in the outer periphery of the hopper for cooling the interior of the hopper;

a nozzle for spraying pure water into the hopper; and a filter for introducing a coolant gas into the hopper in a laminar flow.

According to another aspect of the present invention, there is provided a method of producing hyperfine frozen particles comprising the steps of:

circulating a coolant through a heat exchanger provided in the outer periphery of a hopper so as to cool the wall of the hopper to a temperature substantially equal to that of the interior of the hopper;

spraying pure water into the hopper;

introducing a coolant gas into the hopper through a filter a laminar flow; and converting the pure water to hyperfine frozen particles by means of the coolant gas.

In accordance with this invention, the temperature of the hopper wall is kept substantially equal to that of the interior of the hopper. Due to this arrangement, the hopper wall is prevented from being rapidly cooled and cracking when the coolant gas or frozen particles come into contact with it, thus keeping the hyperfine frozen particles from getting mixed with metal impurities attributable to such cracks. Further, by using a gas coolant, with which the removal of impurity particles is much easier to perform than with a liquid coolant, it is possible to reduce the quantity of impurity particles that are mixed with the hyperfine frozen particles. In addition, the filter provided at one end of the hopper makes the coolant gas flow laminar, with the result that the generation of a turbulent flow or whirling inside the hopper is avoided, thereby preventing the adhesion of frozen particles to the wall and the ceiling of the hopper.

DESCRIPTION OF THE PREFERRED EMBODIMENT

Figure 1:
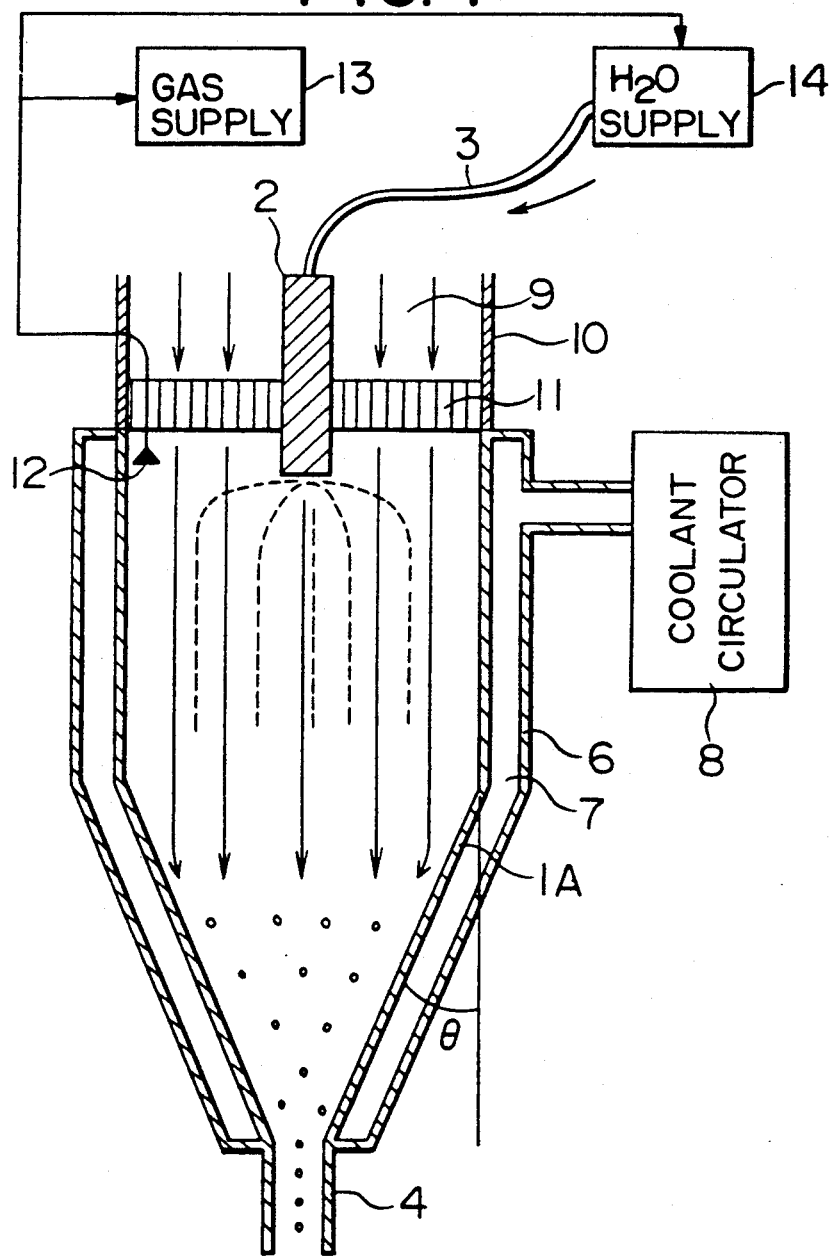
FIG. 1 is a schematic sectional view showing a device for producing hyperfine frozen particles in accordance with an embodiment of this invention.
Figure 2:
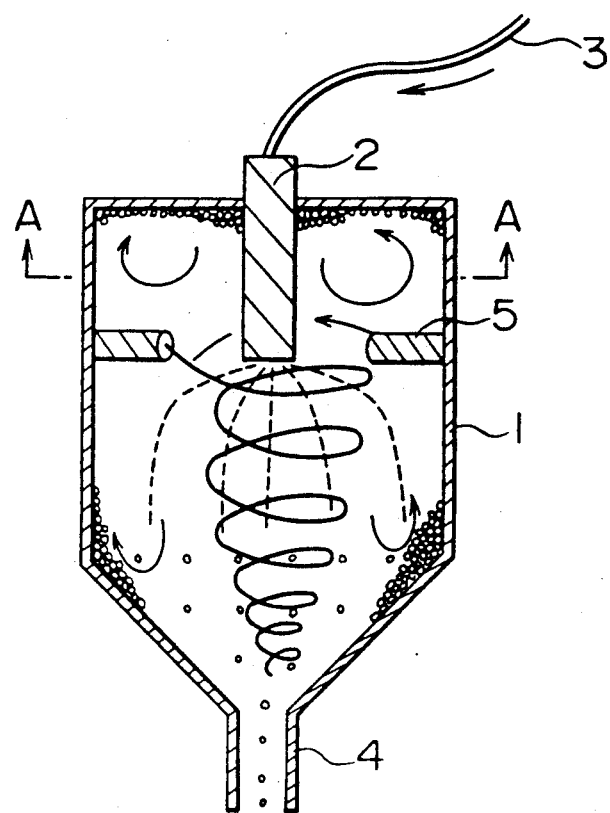
FIG. 2 is a schematic sectional view showing a conventional device for producing hyperfine frozen particles.
Figure 3:
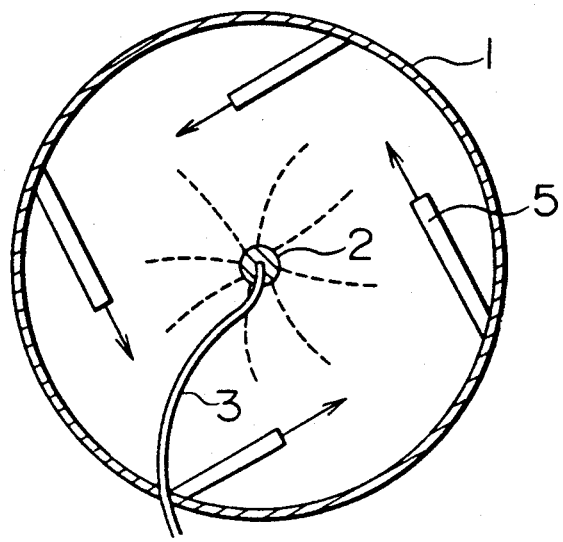
FIG. 3 is a schematic sectional view taken along the line A—A of FIG. 2.

FIG. 1 is a schematic sectional view showing a device for producing hyperfine frozen particles in accordance with an embodiment of this invention. In the accompanying drawings, the same or equivalent components are referred to by the same reference numerals.

Provided in the periphery of a hopper 1A is a heat exchanger 6, through which a coolant 7, such as nitrogen gas or liquid nitrogen, is circulated by means of a coolant circulator 8. Provided in this coolant circulator 8 is a heat discharge means (not shown) for discharging heat to the outside.

Provided above the hopper IA is a nitrogen gas inlet 10, through which a coolant, for example, low-temperature nitrogen gas 9, is supplied, and, provided between this nitrogen gas inlet 10 and the hopper IA is a filter 11, for example, an "HEPA filter", for introducing the nitrogen gas 9 into the hopper 1A in a laminar flow.

The upper section of the hopper 1A may have, for example, a cylindrical configuration, whereas the section that leads to a discharge outlet 4 provided at the bottom is formed, for example, as a circular cone. The tapering angle of this circular cone, $\theta$, is determined from the flow velocity of the nitrogen gas 9 and the flow rate and distribution (expansion) of the pure water supplied. This angle is set to a value which is not likely to produce a turbulent flow.

In this device for producing hyperfine frozen particles, constructed as described above, the hopper 1A is cooled from the outside by the heat exchanger 6 to a temperature approximately corresponding to the boiling point of nitrogen, with the heat taken away from the hopper being discharged to the outside through the coolant circulator 8 by a heat discharge means (not shown). Pure water for ice making is supplied through a pure water supply tube 3 and is sprayed into the hopper 1A by means of a pure water spray nozzle 2. The nitrogen gas 9, which is at a low temperature approximately corresponding to the boiling point of nitrogen, is supplied to the hopper through the nitrogen gas inlet 10, and formed into a uniform laminar flow (a downward flow) as it passes through the filter 11. This nitrogen gas 9, supplied in the form of a laminar flow, is used to freeze the atomized pure water inside the hopper 1A. Since impurity particles are more easily removed from gaseous nitrogen than from liquid nitrogen, using the nitrogen gas 9 helps to reduce the quantity of impurity particles that get mixed with the hyperfine frozen particles produced. Apart from forming the nitrogen gas 9 into a laminar flow, the filter 11 serves to remove any impurity particles in the nitrogen gas 9. The hyperfine frozen particles produced in this way are carried by the downward flow of the nitrogen gas 9 and move downwards towards the discharge outlet 4, without generating any turbulent flow. Since the wall of the hopper 1A is cooled to a temperature substantially equal to that of the interior of the hopper by the heat exchanger 6, the hopper wall is not cooled rapidly by the coolant as in the prior art, so that no cracks are generated in the hopper wall. Further, this cooling helps to avoid adhesion of frozen particles to the hopper wall.

The hyperfine frozen particles descending towards the discharge outlet 4 are narrowed down at the angle of $\theta$ as they move towards the lower end of the hopper 1A. As stated above, this angle $\theta$ is chosen so not to be likely to cause a turbulent flow, so that the hyperfine frozen particles are discharged through the discharge outlet 4, with practically no turbulent flow being generated. Accordingly, adhesion of frozen particles to the hopper wall can be avoided.

The pressure in the hopper 1A is positive due to the combined effect of the nitrogen gas 9 supplied thereto and the tapering configuration of the discharge outlet 4. Fluctuation of the predetermined internal pressure of the hopper 1A may cause clogging in the discharge outlet 4 or generate a turbulent flow or whirling. In view of this, the present device is provided with a pressure sensor 12 for pressure measurement, which measures the internal pressure of the hopper and feeds the measurement results back to a supply system 13 for the nitrogen gas 9 and a supply system 14 for the pure water, thereby making it possible to keep the internal pressure of the hopper 1A at a constant level. This arrangement helps to stabilize the ice making process since it prevents the generation of a turbulent flow due to fluctuation in pressure in the middle and lower sections of the hopper 1A. Further, this arrangement enables the device to be operated continuously since it makes clogging of the discharge outlet 4 unlikely.

What is claimed is:

1. A device for producing hyperfine frozen particles comprising:
    a hopper having a wall defining an interior of said hopper, an inlet end, and an outlet end;
    a heat exchanger for cooling said wall and the interior of said hopper;
    a nozzle for spraying pure water into said hopper at the inlet end; and means for introducing a laminar flow of coolant gas into the inlet end of said hopper.

2. A device as claimed in claim 1 wherein said coolant gas is nitrogen gas.

3. A device as claimed in claim 1 wherein the outlet end of said hopper has a conical configuration.

4. A device as claimed in claim 1 including a pressure sensor for measuring pressure in said hopper and supply means responsive to said pressure sensor for controlling flow of pure water to said nozzle and coolant gas to the inlet end of said hopper to maintain a constant pressure in said hopper.

5. A device as claimed in claim 1 wherein said heat exchanger includes a coolant circulator for circulating a coolant through said heat exchanger.

6. A device as claimed in claim 1 wherein said means for introducing a laminar flow of coolant gas comprises a filter disposed at the inlet end of said hopper.

7. A device as claimed in claim 6 wherein said filter is a HEPA filter.

8. A method of producing hyperfine frozen particles comprising:
    circulating a coolant through a heat exchanger provided on a wall of a hopper to cool the wall to a temperature substantially equal to the temperature within said hopper;

spraying pure water into said hopper from an inlet end;

introducing a coolant gas into said hopper from the inlet end through a filter in a laminar flow; and converting the pure water into hyperfine frozen particles by freezing the water with the coolant gas.

9. A method as claimed in claim 8 including controlling the flow of the coolant gas into said hopper and the flow of the pure water into said hopper to maintain a constant pressure in said hopper.

10. A method as claimed in claim 8 including removing the cooling gas and the frozen particles from the outlet end of said hopper.

* * * * *